(12) United States Patent
Fauser et al.

(10) Patent No.: US 7,016,763 B2
(45) Date of Patent: Mar. 21, 2006

(54) METHOD FOR TRACK CONTROL

(75) Inventors: Matthias Fauser, Grabenstaett (DE);
Steve Kallenborn, Wokingham (GB)

(73) Assignee: Dr. Johannes Heidenhain GmbH, Traunreut (DE)

( * ) Notice: Subject to any disclaimer, the term of this patent is extended or adjusted under 35 U.S.C. 154(b) by 82 days.

(21) Appl. No.: 10/489,552

(22) PCT Filed: Aug. 31, 2002

(86) PCT No.: PCT/EP02/09757

§ 371 (c)(1),
(2), (4) Date: Oct. 28, 2004

(87) PCT Pub. No.: WO03/023535

PCT Pub. Date: Mar. 20, 2003

(65) Prior Publication Data

US 2005/0049743 A1    Mar. 3, 2005

(30) Foreign Application Priority Data

Sep. 10, 2001  (DE) ................................ 101 44 487

(51) Int. Cl.
*G06F 19/00* (2006.01)
(52) U.S. Cl. ...................................... 700/186; 318/571
(58) Field of Classification Search ................ 700/186, 700/184, 188, 195, 159, 160, 187; 318/571–572
See application file for complete search history.

(56) References Cited

U.S. PATENT DOCUMENTS

| 5,500,927 | A | 3/1996 | Sander-Cederlof et al. |
| 6,242,880 | B1 * | 6/2001 | Hong ................ 318/571 |
| 6,317,646 | B1 | 11/2001 | de Caussin et al. |
| 6,754,550 | B1 * | 6/2004 | Hong ................ 700/98 |
| 2003/0083764 | A1 * | 5/2003 | Hong ................ 700/98 |

FOREIGN PATENT DOCUMENTS

| EP | 0 864 952 | 9/1998 |
| EP | 1 102 139 | 5/2001 |
| WO | WO 97/20150 | 6/1997 |
| WO | WO 98/41910 | 9/1998 |

\* cited by examiner

*Primary Examiner*—Zoila Cabrera
(74) *Attorney, Agent, or Firm*—Kenyon & Kenyon

(57) ABSTRACT

A method for continuous-path control includes predefining at least two global tolerances to a numerical control and predefining, to the numerical control, a tool path including support points, a non-continuously differentiable corner of the tool path being situated at each support point. The method also includes assigning, by a tolerance-assignment unit, one of the at least two global tolerances determined to the corner at each support point. A global edge tolerance may be predefined when the tolerance-assignment unit recognizes that the corner at the support point leads to an edge in a workpiece. A global curve tolerance may be predefined when the tolerance-assignment unit recognizes that the corner at the support point approximates a curvilinear, continuously differentiable curve. A global edge tolerance may be predefined to be smaller than a global curve tolerance. A numerical control includes an arrangement for specifying at least two global tolerances and an arrangement for specifying a tool path having support points at which non-continuously differentiable corners of the tool path are situated. The numerical control also includes a tolerance-assignment unit adapted to assign one of the at least two global tolerances to the corner at each support point.

17 Claims, 1 Drawing Sheet

METHOD FOR TRACK CONTROL

FIELD OF THE INVENTION

The present invention relates to a method for continuous-path control.

BACKGROUND INFORMATION

Numerical controls (NCs) are used in modern machine tools to control the positioning and movement of tools relative to a workpiece. To machine a workpiece in accordance with a stipulation, it may be necessary to move the tool relative to the workpiece on paths established beforehand. Therefore, this type of system may be described as a continuous-path control. The desired paths may be determined in a parts program that is executed by the numerical control. The numerical control may convert the geometrical instructions of the parts program into instructions for the positional control of the different axes of the machine tool.

To produce the parts program, CAD/CAM systems may be used to calculate tool paths from a predefined geometry of the body to be manufactured, taking into account, for example, the tool radius. Curved, continuously differentiable surfaces of the body to be manufactured are obtained by curvilinear, continuously differentiable curves in the tool path. They are approximated by polylines (or polygon curves) whose segments form non-continuously differentiable corners. A programmer may also create such parts programs directly, which, however, may be costly.

Thus, the machining of the workpiece is established in the parts program by the specification of the tool path. If one looks at this tool path more closely, it may be possible to divide the corners formed by the segments of the polyline into two categories. First of all, there are corners whose dimensional accuracy may be important for the later functioning of the workpiece, since edges of the workpiece are defined by these corners. However, there are also corners which may only be used to approximate curvilinear, continuously differentiable curves. The dimensional accuracy when executing these corners may not be as important here. A roundness of these corners may even prevent faceting of the actually smooth surface, the faceting developing due to the approximation by a polyline.

Since, namely, a machine tool is subject to certain restrictions with respect to the maximum acceleration and also the maximum jerk (change of acceleration) in its axes of motion, it is not possible to pass through a corner, provided in the parts program, between two segments of the tool path with a finite speed exactly, since to that end, an infinite acceleration would be necessary. Therefore, the maximum speed with which a corner may be traversed is a function of the maximum permissible tolerance with which the actual tool path may deviate from the ideal tool path. The greater this tolerance, the higher the possible speed. In this context, as speed increases, a corner established in the parts program becomes increasingly rounded. On the other hand, segments can be executed with an accuracy that is dependent only on the quality of the regulated drive system.

In a continuous-path control of the conventional type, a global corner tolerance acting on all corners of the tool path may be determined which, together with the mentioned parameters of maximum acceleration and maximum jerk, as well as the angle of the direction change from one segment of the tool path to the next segment, may establish the maximum permissible speed in the region of the corner.

European Published Patent Application No. 0 864 952 describes a method for machining a workpiece with maximum machining speed, for which the maximum permissible tolerance is taken into account. In that case, it may be possible to specify different tolerances for different regions of the tool path. However, when programming a tool path, it may be costly to indicate a smaller tolerance (edge tolerance) before each corner which leads to an edge in the contour of the workpiece, and to again specify a greater tolerance (curve tolerance) for the region then following, when only a continuously differentiable curve is being approximated by a polyline through the programmed corners. Therefore, usually only one tolerance is set for the execution of a polyline, namely, the smaller of the two tolerances.

The result is that paths having non-continuously differentiable corners are always executed with the edge tolerance, and thus in regions in which the greater curve tolerance would really be allowed, corners are executed with too low a speed. The machining time of the workpiece may therefore be unnecessarily great.

SUMMARY

It is an aspect of the present invention is to provide a method for continuous-path control which, with low expenditure, may make it possible to calculate optimized machining speeds for a tool path.

It is provided to specify to a numerical control, at least two globally acting tolerances for the corners of a programmed tool path. In this context, a smaller edge tolerance is to be valid at all corners which lead to edges in the contour of the workpiece; a larger curve tolerance is to be valid at all corners formed by the described tool-path approximation of a curvilinear, continuously differentiable curve, for instance, in the programming with the aid of a CAD/CAM system. A rougher positioning tolerance may be specified for corners which do not lie within the workpiece.

The programmed tool path is analyzed by a tolerance-assignment unit. This tolerance-assignment unit decides for each corner predefined in the tool path whether an edge in the contour of the workpiece is formed due to this corner, or whether this corner has developed merely by the approximation of a curved, continuously differentiable path with the aid of a polyline. In the first case, the edge tolerance is utilized for machining the corner, and therefore for calculating the allowed tool-path feed-rate. In the second case, the curve tolerance is taken into consideration for this purpose.

In accordance with this decision by the tolerance-assignment unit, the numerical control is able to determine the maximum speed in each instance for traveling each corner. The edge tolerance and the curve tolerance only have to be predefined once, for instance, at the beginning of the parts program or as configuration parameters in the continuous-path control. To this end, suitable input possibilities are to be provided in the numerical control. It may also be possible to predefine one of the two tolerances, as well as one factor which must act upon this tolerance to obtain the other tolerance.

Further aspects of the present invention and details pertaining thereto are derived from the following description of the attached Figures.

DETAILED DESCRIPTION

Figure 1:
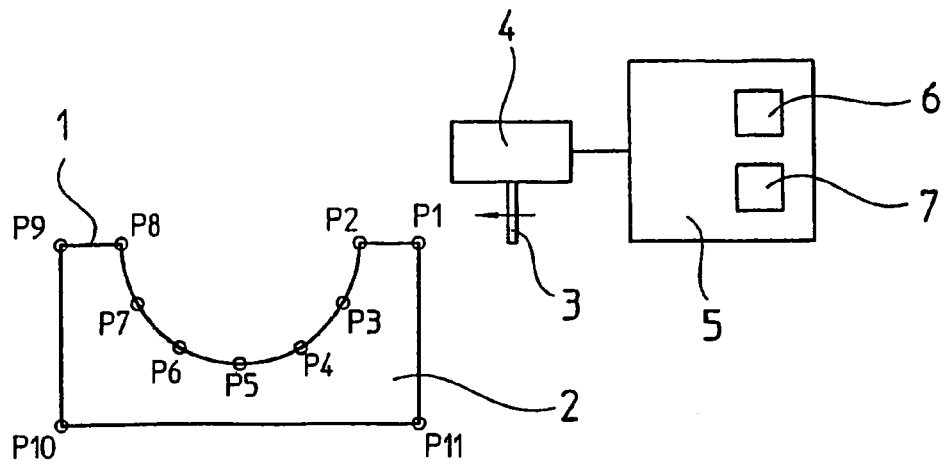
FIG. 1 shows an exemplary embodiment of a predefined tool path.

FIG. 1 shows a tool path 1 predefined by support points P1-P11. Due to this tool path 1, the cross-section of workpiece 2 assumes the shape of a rectangle P1-P9-P10-P11, whose side P1-P9 has a semicircular recess P2-P8. Semicircle P2-P8 is approximated by a polyline having corners at P2, P3, P4, P5, P6, P7 and P8. The corners at P3, P4, P5, P6 and P7 may be machined while observing a larger curve tolerance, while the corners at P2, P8, P9, P10 and P11 lead to edges in workpiece 2, and therefore must be executed with the edge tolerance. The stipulation of a tolerance is not necessary at P1, since the edge at P1 may be approached in horizontal fashion by tool 3 and left in perpendicular fashion, and therefore no corner has to be executed at P1.

Figure 2:
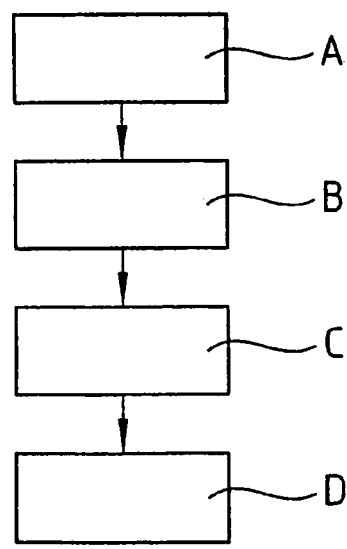
FIG. 2 shows an exemplary method for executing this tool path.

A method for controlling tool path 1 is discussed with regard to FIG. 2.

In step A, the edge tolerance and the curve tolerance are predefined to the numerical control independently of each other via suitable input possibilities. This may be necessary only once and may be carried out either in the parts program or directly in the numerical control itself. The tolerances are stored, for example, in a memory 7 of a numerical control 5 and are valid globally. The edge tolerance may be selected to be smaller than the curve tolerance. A typical value for the edge tolerance may be 10 $\mu$m A meaningful curve tolerance may, for instance, be a factor of two above that, and may then, for example, be 20 $\mu$m.

In step B, tool path 1 to be executed by tool 3 is predefined to numerical control 5, e.g., in the form of a parts program stored in memory 7 of numerical control 5. The parts program in the example of FIG. 1 describes a tool path 1 on the basis of support points P1-P11 that, for example, are interconnected by linear segments and thus form a polyline. Non-continuously differentiable corners are formed at support points P2-P11.

In step C, a tolerance-assignment unit 6 analyzes the corners at support points P2-P11 in terms of criteria which are described below. In so doing, it is decided whether the specific corner leads to an edge in the workpiece, or whether the corner is merely used to approximate a curvilinear, continuously differentiable curve. In the first case, tolerance-assignment unit 6 assigns the edge tolerance to each of the corners at support points P2-P11 of tool path 1, and the curve tolerance in the second case.

In step D, numerical control 5 instructs machine tool 4 to execute predefined tool path 1, and at the same time, calculates for each of the corners at P2-P11 the maximum possible speed which in each instance permits observance of the tolerances valid for these corners.

The sequence of the steps described is not limited to the sequence of their description. It may only be important that, at the moment a corner at P2-P11 is machined, tolerance-assignment unit 6 has made the decision about the tolerance to be used, and therefore the optimal speed for the machining may be stipulated. This is carried out taking into account the fact that, when traveling a non-continuously differentiable corner with finite speed, because of the limitation due to the maximum possible acceleration and the maximum possible jerk, deviations from the predefined path may inevitably occur which are not greater according to the amounts than the tolerance predefined in each case.

Tests with real parts programs have shown that, due to the higher machining speeds at corners with effective curve tolerance, an increase by 10% in the throughput of machine tool 4 involved may be attainable compared with a machining cycle in which the edge tolerance acts on all corners of tool path 1.

Figure 3:
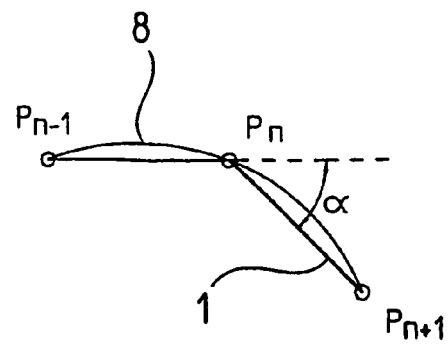
FIG. 3 shows an exemplary segment of a predefined tool path.

With reference to FIG. 3, it shall now be described which criteria enable tolerance-assignment unit 6 to decide the assignment of the specific tolerances for each corner to be machined. Tool path 1 is predefined by support points Pn−1, Pn, Pn+1. For the corner at Pn, it is decided whether it is an edge-forming corner or a corner formed by approximation of a curvilinear, continuously differentiable curve.

First of all, angle $\alpha$ of the direction change of the two segments adjoining the corner at support point Pn may be considered. If it is smaller than or equal to a specific limiting angle, then the curve tolerance is assigned. If it is larger, the edge tolerance is assigned. An angle $\alpha$ of 30 degrees may be a meaningful limiting value. In this context, it is assumed that when approximating a continuously differentiable curve, the segments are selected to be so short that no angles larger than the limiting angle are formed between them. In the example in FIG. 1, the change in direction at corner P2 is 90 degrees, thus here the edge tolerance must be assigned, while the change in direction in the corners at P3-P7 is less than 30 degrees, and therefore the curve tolerance may be used.

A further criterion may be that an edge-forming corner may always be assumed when the longer of the two segments Pn−1-Pn and Pn-Pn+1 adjoining the corner at support point Pn is longer than a specific limiting length, and therefore the edge tolerance is assigned. This criterion starts from the assumption that longer segments are not provided for approximating a curvilinear, continuously differentiable curve, and therefore the adjoining corner forms an edge in the workpiece.

It should also be mentioned that the radius of a circular arc 8, defined by Pn−1, Pn and Pn+1, may be determined as an additional criterion. If this radius lies above a limiting radius (500 mm has proven worthwhile in practice), then an edge-forming corner at support point Pn is assumed.

Numerous further criteria with which tolerance-assignment unit 6 is able to work may be found on the basis of geometric considerations. They are based above all on assumptions about a meaningful approximation of curvilinear, continuously differentiable curves by polylines. Thus stronger (like the first named) and weaker (like the two other described) criteria may be obtained which more or less unequivocally permit a judgment of the specific corner at Pn.

When using a plurality of criteria in tolerance-assignment unit 6, it may be useful to assign the edge tolerance to a corner when only one of the criteria demands it. However, when using weaker criteria, it may also be useful to only assign the edge tolerance when several of these criteria speak for it. It may be better to machine a corner that merely approximates a curvilinear, continuously differentiable curve using the edge tolerance than to machine an edge-forming corner using the curve tolerance, since in the first case, a lower tool path feed-rate is merely used, while in the second case, a tolerance specification may be violated.

For special applications, it may also be useful to work with more than two tolerances. Based on suitable geometric considerations, a tolerance may then also be assigned from a selection of three or more tolerances, for instance, by determining a plurality of limiting angles for direction change $\alpha$ of tool path 1 at a corner Pn.

The method described above may also be used in numerical controls 5 that permit direct programming of tool-path segments such as circular arcs, splines or other curved tool paths 1 in the parts program. Curve information thus already existing may then be utilized directly for determining the tolerance to be used in each instance within such tool-path segments. The criteria described above may be used for the transitions to the respective next tool-path segment.

Provision may also be made to change the one or both tolerances during the machining of the workpiece in the event the possibility of specifying only two tolerances is not sufficient. For instance, this may be carried out by suitable commands in the parts program.

An additional option for the method described for continuous-path control is a function of numerical control 5 which monitors the programmed tool-path feed-rate and, if a limiting speed (e.g. 15 to 20 meters per minute) is exceeded, recognizes that the movement of tool 3 may only be a positioning movement and that tool 3 is thus not engaged with workpiece 2. The corners of this section of tool path 1 may then be assigned a further tolerance, namely, the positioning tolerance which, in addition to the edge tolerance and the corner (or curve) tolerance, is globally specifiable. In this sense, the monitoring of the programmed tool-path feed-rate may also be understood as a further criterion for tolerance-assignment unit 6. A meaningful value for the positioning tolerance may lie in the range of 0.1 to 1 mm.

What is claimed is:

1. A method for continuous-path control, comprising:
   (a) predefining at least two global tolerances to a numerical control;
   (b) predefining to the numerical control a tool path including support points, the support points including non-continuously differentiable corners of the tool path; and
   (c) assigning by a tolerance-assignment unit one of the global tolerances determined in step (a) to each corner at a support point;
   wherein:
   step (a) includes predefining a global edge tolerance; and
   step (c) includes assigning the global edge tolerance when the tolerance-assignment unit recognizes that the corner at a support point leads to an edge in a workpiece.

2. The method of claim 1, wherein:
   step (a) includes predefining a global positioning tolerance; and
   step (c) includes assigning the positioning tolerance when a programmed tool-path feed-rate in a region of the corner at a support point is greater than a limiting speed.

3. The method as recited in claim 1, wherein the global edge tolerance is assigned when an angle of a direction change at the corner at the support point is larger than a limiting angle.

4. The method as recited in claim 1, wherein the global edge tolerance is assigned when a longer segment of two segments forming the corner at a support point is longer than a limiting length.

5. The method as recited in claim 1, wherein the global edge tolerance is assigned when a radius of a circular arc through three support points is larger than a limiting radius.

6. The method as recited in claim 1, further comprising:
   (d) instructing by the numerical control a machine tool to execute the tool path, taking into consideration the tolerance assigned for each corner.

7. A method for continuous-path control, comprising:
   (a) predefining at least two global tolerances to a numerical control;
   (b) predefining to the numerical control a tool path including support points, the support points including non-continuously differentiable corners of the tool path; and
   (c) assigning by a tolerance-assignment unit one of the global tolerances determined in step (a) to each corner at a support point;
   wherein:
   step (a) includes predefining a global curve tolerance; and
   step (c) includes assigning the global curve tolerance when the tolerance-assignment unit recognizes that the corner at a support point approximates a curvilinear, continuously differentiable curve.

8. The method of claim 7, wherein:
   step (a) includes predefining a global positioning tolerance; and
   step (c) includes assigning the positioning tolerance when a programmed tool-path feed-rate in a region of the corner at a support point is greater than a limiting speed.

9. The method as recited in claim 7, further comprising:
   (d) instructing by the numerical control a machine tool to execute the tool path, taking into consideration the tolerance assigned for each corner.

10. A method for continuous-path control, comprising:
    (a) predefining at least two global tolerances to a numerical control;
    (b) predefining to the numerical control a tool oath including support points, the support points including non-continuously differentiable corners of the tool path; and
    (c) assigning by a tolerance-assignment unit one of the global tolerances determined in step (a) to each corner at a support point;
    wherein:
    step (a) includes predefining a global edge tolerance and predefining a global curve tolerance, the global edge tolerance smaller than the global curve tolerance; and
    step (c) includes assigning the global edge tolerance when the tolerance-assignment unit recognizes that the corner at a support point leads to an edge in a workpiece and assigning the global curve tolerance when the tolerance-assignment unit recognizes that the corner at a support point approximates a curvilinear, continuously differentiable curve.

11. The method of claim 10, wherein:
    step (a) includes predefining a global positioning tolerance; and
    step (c) includes assigning the positioning tolerance when a programmed tool-path feed-rate in a region of the corner at a support point is greater than a limiting speed.

12. The method as recited in claim 10, wherein the global edge tolerance is assigned when an angle of a direction change at the corner at the support point is larger than a limiting angle.

13. The method as recited in claim 10, wherein the global edge tolerance is assigned when a longer segment of two segments forming the corner at a support point is longer than a limiting length.

14. The method as recited in claim 10, wherein the global edge tolerance is assigned when a radius of a circular arc through three support points is larger than a limiting radius.

15. The method as recited in claim 10, further comprising:

(d) instructing by the numerical control a machine tool to execute the tool path, taking into consideration the tolerance assigned for each corner.

16. A numerical control, comprising an arrangement configured to specify at least two global tolerances, including a global edge tolerance and a global curve tolerance, the global edge tolerance smaller than the global curve tolerance;

an arrangement configured to specify a tool path having support points at which non-continuously differentiable corners of the tool path are situated; and a tolerance-assignment unit configured to assign one of the global tolerances to each corner at a support point, the tolerance-assignment unit configured to assign the global edge tolerance when the tolerance assignment unit recognizes that the corner at a support point leads to an edge in a workpiece and configured to assign the global curve tolerance when the tolerance-assignment unit recognizes that the corner at a support point approximates a curvilinear, continuously differentiable curve.

17. A numerical control, comprising means for specifying at least two global tolerances, including a global edge tolerance and a global curve tolerance, the global edge tolerance smaller than the global curve tolerance;

means for specifying a tool path having support points at which non-continuously differentiable corners of the tool path are situated; and tolerance-assigning means for assigning one of the global tolerances to each corner at a support point, the tolerance-assignment means assigning the global edge tolerance when the tolerance assignment means recognizes that the corner at a support point leads to an edge in a workpiece and assigning the global curve tolerance when the tolerance-assignment means recognizes that the corner at a support point approximates a curvilinear, continuously differentiable curve.

* * * * *